United States Patent [19]

Go et al.

[11] 4,357,461
[45] Nov. 2, 1982

[54] POLYESTER STABILIZATION AND COMPOSITION

[75] Inventors: Santos W. Go; Dennis J. Burzynski, both of Toledo, Ohio

[73] Assignee: Owens-Illinois, Inc., Toledo, Ohio

[21] Appl. No.: 329,979

[22] Filed: Dec. 11, 1981

[51] Int. Cl.³ .............................................. C08G 63/22
[52] U.S. Cl. ................................ 524/724; 528/272; 528/274; 528/285; 524/878; 528/275
[58] Field of Search ............... 528/272, 274, 275, 285

[56] References Cited

U.S. PATENT DOCUMENTS

| | | | |
|---|---|---|---|
| 4,142,040 | 2/1979 | Jabarin et al. | 528/272 X |
| 4,154,920 | 5/1979 | Jabarin | 528/272 |
| 4,230,819 | 10/1980 | Hauenstein et al. | 528/272 X |
| 4,238,593 | 12/1980 | Duh | 528/272 |

Primary Examiner—Lucille M. Phynes

Attorney, Agent, or Firm—Charles S. Lynch; Myron E. Click; David H. Wilson

[57] ABSTRACT

Disclosed is a process for preparing a saturated polyester resin containing

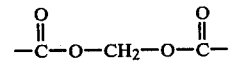

groups and having good stability against generation of acetaldehyde at elevated temperatures, which comprises having an alkali metal salt of ethylenediaminetetraacetic acid present in the melt polymerization reaction mixture during formation of such polyester, in an amount up to 0.5 mol percent based on the saturated di- and polycarboxylic acid moieties entering into the polymerization reaction, and products.

18 Claims, No Drawings

POLYESTER STABILIZATION AND COMPOSITION

This invention relates to novel, heat stable polyester compositions. More particularly, this invention relates to saturated polyesters having

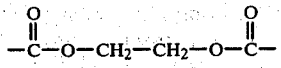

groups, stabilized against thermal decomposition to yield chiefly acetaldehyde. The present invention reduces the acetaldehyde generation rate.

The term "saturated polyester" encompasses a wide variety of materials which are of significant industrial and economic importance. Well-known polyester materials include polyester fibers, polyester tire cord, plasticizers, alkyds and polyester molding resins suitable for extrusion, injection and blow molding plastic articles.

For the purposes of this invention it is intended to include those saturated polyesters having linear chain-like structures, which include in their backbone

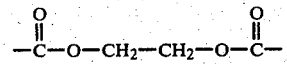

groups, derived by reacting compounds such as dicarboxylic acids or their acid functioning derivatives with dihydric alcohols, including ethylene glycol; and those polyesters having cross-linked, three dimensional structures derived by reacting di- or poly-carboxylic acids with diols and polyols, always including a significant portion of ethylene glycol; said polyesters or copolyesters may contain alkyl or aryl or cycloalkyl or other groups which are not ethylenically unsaturated. The end valences of said

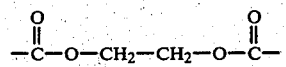

groups are of course bonded to carbon atoms as will be understood.

It is well-known to those skilled in the art that most polyesters are relatively stable materials as compared with other types of polymers, e.g., polyvinyl acetate, polystyrene, polyurethanes, etc. It is also well-known, however, that when saturated polyesters are exposed to high temperatures, as they often must be during processing and application from the molten state, they tend to degrade with detrimental loss of physical and chemical properties. This condition often results in inferior products at best, or worse, it renders these materials useless in the intended application thereby contributing to substantial economic losses to manufacturer and end-user alike.

More specifically, with the growing use of plastic bottles for beverages such as carbonated soft drinks and beer, it has been found to be important that the container wall have a low concentration of acetaldehyde; otherwise, the taste of the beverage is deleteriously affected and the container cannot be used. In particular, the invention is useful in poly(ethylene terephthalate) resins widely used for bottles for packaging carbonated soft drinks; such polymers contain in their polymer backbone a major weight portion of ethylene terephthalate units of the structure

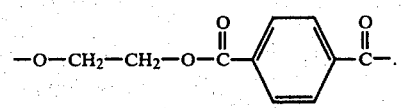

During physical processing of polyesters in the hot, molten state to shape the polymer into a final product or even an intermediate shape such as a parison, it is known that the decomposition results in the formation of various degradation products. It is known that thermal degradation of poly(ethylene terephthalate) under the influence of heat alone results in various phenomena, including some reduction in molecular weight, some discoloration and also the evolution of volatile products, chiefly acetaldehyde.

It is an object of the present invention to provide a method for stabilizing a saturated polyester resin containing

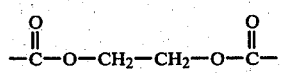

groups against thermal degradation.

Another object of the invention is to provide a saturated polyester resin stabilized against generation of acetaldehyde at elevated temperatures.

Other objects, features and advantages of the invention will become apparent upon a study of the accompanying disclosure.

According to the present invention, there is provided a process whereby stability of a saturated polyester, containing

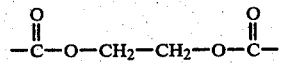

groups, toward acetaldehyde generation is increased, which process comprises having an alkali metal salt of ethylenediaminetetraacetic acid present during melt polymerization to form such polyester. Any amount up to 0.5 mol percent of the salt, based on the saturated di- or polydicarboxylic acid moieties entering into the polymerization reaction, is an effective amount to decrease thermal acetaldehyde generation; usually at least 0.001 mol percent, and usually no more than 0.2 mol percent is present, especially when it is desired to eliminate discoloration. Higher amounts of the salt in the noted range, or above 0.5 percent, cause increasing discoloration.

According to another aspect of the present invention, there is provided a saturated polyester against thermal degradation to yield acetaldehyde which comprises a saturated polyester having

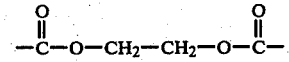

groups in its backbone to which had been added an alkali metal salt of ethylenediaminetetraacetic acid during melt polymerization to form said polyester.

The polyesters of the present invention have inherent viscosities of at least 0.5 dl/gm.

Suitable methods of preparing saturated polyesters to be stabilized according to the invention are disclosed in U.S. Pat. Nos. 2,465,310 and 2,623,031 and in "Polymers and Resins", pp. 283-9, D. Van Nostrand Co., Inc. 1959.

In the foregoing process of the invention, the alkali metal salt is usually the sodium or potassium salt, most usually the sodium salt. Moreover, as stated, the process as well as the product is especially useful where the polyester resin is a molding grade resin having in the polymer backbone a major weight portion of ethylene terephthalate units of the structure

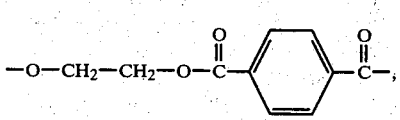

including poly(ethylene terephthalate) and copolyesters based on poly(ethylene terephthalate).

In specific illustrations of the invention, the following work was carried out:

EXAMPLE 1

A copolyester was prepared from terephthalic acid, ethylene glycol and 4,4'-bis (hydroxyethoxyphenyl) sulfone in the presence of 0.01 mole % (based on TPA) tetrasodium (ethylenediamine) tetraacetate as follows:

332.3 grams (2 moles) of terephthalic acid, 151.28 grams of ethylene glycol, 47.35 grams of 4,4'-bis (hydroxyethoxyphenyl) sulfone, 0.1458 grams of $Sb_2O_3$ and 0.076 grams of tetrasodium (ethylenediamine) tetraacetate were charged into a 1-liter stainless steel reactor equipped with a stirrer, nitrogen gas inlet port and a condenser. The reaction mixture was heated to 260° C. under 30 psi nitrogen pressure for 1 hour. Water was continuously distilled out during this period. After the esterification reaction the pressure was brought down to atmospheric pressure. Then 0.688 grams of tris-nonylphenyl-phosphite was added into the reaction mixture. After 10 minutes at 260° C., the nitrogen gas was turned off and a vacuum of less than 0.5 mm Hg was applied. The reaction was continued at 260° C. for 2 hours and 3 minutes. The inherent viscosity of the product was 0.457. The product was ground to an average size of 16 mesh size. The inherent viscosity of the product was increased to 0.792 by solid-state polymerization, at 190° C. for 7 hours under nitrogen flow, of the ground product. The final product was heated in a sealed test tube at 270° C. for 5 minutes and 10 minutes, and the acetaldehyde generated was measured. The acetaldehyde gas generated at 5 and 10 minutes was 1.1 and 3.8 ppm of the weight of the polymer, respectively, and represents the "acetaldehyde concentration".

EXAMPLE 2 (Control)

Example 1 was repeated except that the sodium salt of ethylenediaminetetraacetic acid was omitted. The acetaldehyde generated was 2.8 ppm and 12.5 ppm for 5 and 10 minutes, respectively, demonstrating the great improvement according to invention Example 1

EXAMPLE 3

Into a 1 liter stainless steel reactor equipped with a nitrogen gas inlet tube, stirrer and condenser, the following were added:

| | |
|---|---|
| 332.3 g | terephthalic acid |
| 142.8 g | ethylene glycol |
| 0.1457 g | $Sb_2O_3$ |
| 0.1520 g | $(Na)_4$—EDTA |

The reaction mixture was heated at 240° C. under 35 psi of nitrogen gas pressure for 2 hours. Water was continuously distilled off during this period. Then the pressure was brought back to atmospheric pressure under nitrogen flow and 0.688 g of tris-nonylphenylphosphite was added to the reaction mixture. The reaction temperature was increased to 260° C. and the nitrogen gas flow was stopped. Then a vacuum of less than 0.5 mm Hg was applied. The reaction was continued at 275° C. under less than 0.5 mm Hg vacuum for 2 hours. The product had an inherent viscosity of 0.55. The product was ground to 20 mesh size and this material was subjected to solid state polycondensation at 200° C. under nitrogen flow for 7 hours. The solid state product has an inherent viscosity of 0.68. The acetaldehyde gas generated after 5 minutes and 10 minutes at 270° C. was determined to be 2.5 and 31 ppm, respectively.

EXAMPLE 4

PET without addition of the sodium salt of ethylenediaminetetraacetic acid was prepared as follows: Into a 1 liter stainless steel reactor round bottom flask equipped with a nitrogen gas inlet tube, stirrer and a condenser, the following were added:

| | |
|---|---|
| 332.3 g | terephthalic acid |
| 142.8 g | ethylene glycol |
| 0.1457 g | $Sb_2O_3$ |
| 0.7685 g | Trimellitic acid anhydride |

The reaction mixture was heated to 260° C. under a 35 psi of nitrogen gas pressure for 1½ hours. Water was continuously distilled off during this period. Then the pressure was brought back to atmospheric pressure under nitrogen flow and 0.688 g of tris-nonylphenylphosphite was added to the reaction mixture. The reaction temperature was increased to 260° C. and the nitrogen gas flow was stopped. Then a vacuum of less than 0.5 mm Hg was applied. The reaction was continued at 275° C. under less than 0.5 mm Hg vacuum for 2½ hours. The product had an inherent viscosity of 0.54. The product was ground to 20 mesh size and this material was subjected to solid state polycondensation at 200° C. under nitrogen flow for 7 hours. The solid state product had an inherent viscosity of 0.8. The acetaldehyde gas generated, or "acetaldehyde concentration" after 5 minutes and 10 minutes at 270° C. was determined to be 9.3 to 34 ppm.

In the foregoing examples, measurements were conducted after the test tubes had cooled to room temperature, using a gas chromatograph instrument. The "acetaldehyde concentration" is that obtained by dividing the weight of the original polymer sample into the total weight of acetaldehyde found in the vapor phase of the test tubes. While the acetaldehyde found does not take into account that which is dissolved in the molten polymer, the comparative data nevertheless shows that the additive stabilizes the polyester, retarding the generation of acetaldehyde.

As will be evident to those skilled in the art, various modifications of this invention can be made or followed in the light of the foregoing disclosure and discussion without departing from the spirit and scope of the disclosure or from the scope of the claims.

I claim:

1. A process for preparing a saturated polyester resin containing

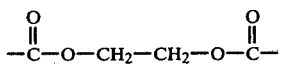

groups and having good stability against generation of acetaldehyde at elevated temperatures, which comprises having an alkali metal salt of ethylenediaminetetraacetic acid present in the melt polymerization reaction mixture during formation of such polyester, in an amount up to 0.5 mol percent based on the saturated di- and polycarboxylic acid moieties entering into the polymerization reaction.

2. A process according to claim 1 wherein said salt is present in an amount of at least 0.001 mol percent.

3. A process according to claim 1 wherein said salt is present in an amount of at least 0.002 mol percent.

4. A process according to claim 2 wherein said salt is present in an amount up to 0.2 mol percent.

5. A process according to claim 2 where said polyester has a major weight portion of ethylene terephthalate units of the structure

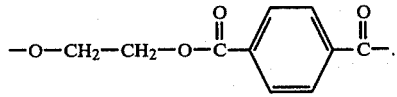

6. A process according to claim 2 wherein said alkali metal is sodium.

7. A process according to claim 2 wherein said alkali metal is potassium.

8. A process according to claim 5 wherein said alkali metal is sodium.

9. A process according to claim 5 wherein said alkali metal is potassium.

10. A saturated polyester having good stability against thermal degradation to yield acetaldehyde which comprises a saturated polyester having

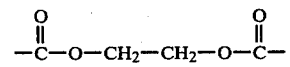

groups in its backbone to which has been added an alkali metal salt of ethylenediaminetetraacetic acid during melt polymerization, in an amount of up to 0.5 mol percent of the combined saturated carboxylic acids present in said polyester.

11. A saturated polyester according to claim 10 wherein said salt amount is at least 0.001 mol percent.

12. A saturated polyester according to claim 10 wherein said salt amount is at least 0.002 mol percent.

13. A saturated polyester according to claim 12 wherein said salt amount is up to 0.2 mol percent.

14. A saturated polyester according to claim 11 wherein said polyester has a major weight portion of ethylene terephthalate units of the structure

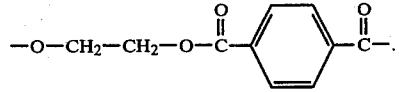

15. A saturated polyester according to claim 11 wherein said alkali metal is sodium.

16. A saturated polyester according to claim 11 wherein said alkali metal is potassium.

17. A saturated polyester according to claim 14 wherein said alkali metal is sodium.

18. A saturated polyester according to claim 14 wherein said alkali metal is potassium.

* * * * *